(12) United States Patent
Uchida et al.

(10) Patent No.: US 8,755,668 B2
(45) Date of Patent: Jun. 17, 2014

(54) PLAYBACK APPARATUS AND PLAYBACK METHOD

(75) Inventors: Kosuke Uchida, Higashiyamato (JP); Masahiro Tada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 13/109,930

(22) Filed: May 17, 2011

(65) Prior Publication Data

US 2011/0280543 A1 Nov. 17, 2011

(30) Foreign Application Priority Data

May 17, 2010 (JP) ................................. 2010-113534

(51) Int. Cl.
*H04N 5/765* (2006.01)
*H04N 9/804* (2006.01)
*H04N 7/01* (2006.01)

(52) U.S. Cl.
CPC ............ *H04N 9/8042* (2013.01); *H04N 7/0122* (2013.01)
USPC .......................................... 386/232; 348/556

(58) Field of Classification Search
CPC ............................ H04N 9/8042; H04N 7/0122
USPC .......... 386/230, 232, 353, 355, 356; 348/556, 348/565, 626, 699, 554, 555, 557, 55, 581, 348/604; 345/467
See application file for complete search history.

(56) References Cited

U.S. PATENT DOCUMENTS

| | | | | |
|---|---|---|---|---|
| 5,146,331 A | * | 9/1992 | Tsuchida | 348/556 |
| 5,784,123 A | * | 7/1998 | Yoshimi | 348/556 |
| 6,714,253 B2 | * | 3/2004 | Cho et al. | 348/556 |
| 7,430,019 B2 | * | 9/2008 | Kim et al. | 348/606 |
| 7,453,521 B2 | | 11/2008 | Iwaki | |
| RE41,104 E | | 2/2010 | Iwaki | |
| 2004/0091168 A1 | * | 5/2004 | Jones et al. | 382/261 |
| 2005/0128357 A1 | * | 6/2005 | Kim et al. | 348/625 |
| 2006/0066639 A1 | | 3/2006 | Iwaki | |
| 2006/0192781 A1 | * | 8/2006 | Iwata et al. | 345/467 |
| 2008/0143877 A1 | * | 6/2008 | Urabe et al. | 348/556 |
| 2009/0154550 A1 | | 6/2009 | Aso et al. | |
| 2010/0225578 A1 | * | 9/2010 | Ko | 345/156 |
| 2011/0176786 A1 | * | 7/2011 | Cooper et al. | 386/230 |

FOREIGN PATENT DOCUMENTS

| | | |
|---|---|---|
| JP | 2006-94420 A | 4/2006 |
| JP | 2006-101407 | 4/2006 |

(Continued)

OTHER PUBLICATIONS

First Office Action mailed by Japan Patent Office on Aug. 2, 2012 in the corresponding to Japanese patent application No. 2010-113534.

*Primary Examiner* — Thai Tran
*Assistant Examiner* — Mishawn Dunn
(74) *Attorney, Agent, or Firm* — Knobbe, Martens, Olson & Bear, LLP

(57) ABSTRACT

According to one embodiment, a playback apparatus includes a decoder, a resolution receiver, and an image quality enhancer. The decoder configured to decode encoded first moving image data to generate second moving image data. The resolution receiver configured to receive a resolution of a display device on which a video image based on the second moving image data is displayed. The image quality enhancer configured to perform image quality enhancement processing to the second moving image data according to the resolution of the display device.

12 Claims, 5 Drawing Sheets

(56) References Cited

FOREIGN PATENT DOCUMENTS

| JP | 2007-013315 A | 1/2007 |
| JP | 2007-306095 | 11/2007 |
| JP | 2007-306095 A | 11/2007 |
| JP | 2008-193594 A | 8/2008 |
| JP | 2009-200536 | 9/2009 |
| JP | 2010-041691 A | 2/2010 |
| JP | 2010-109857 A | 5/2010 |

* cited by examiner

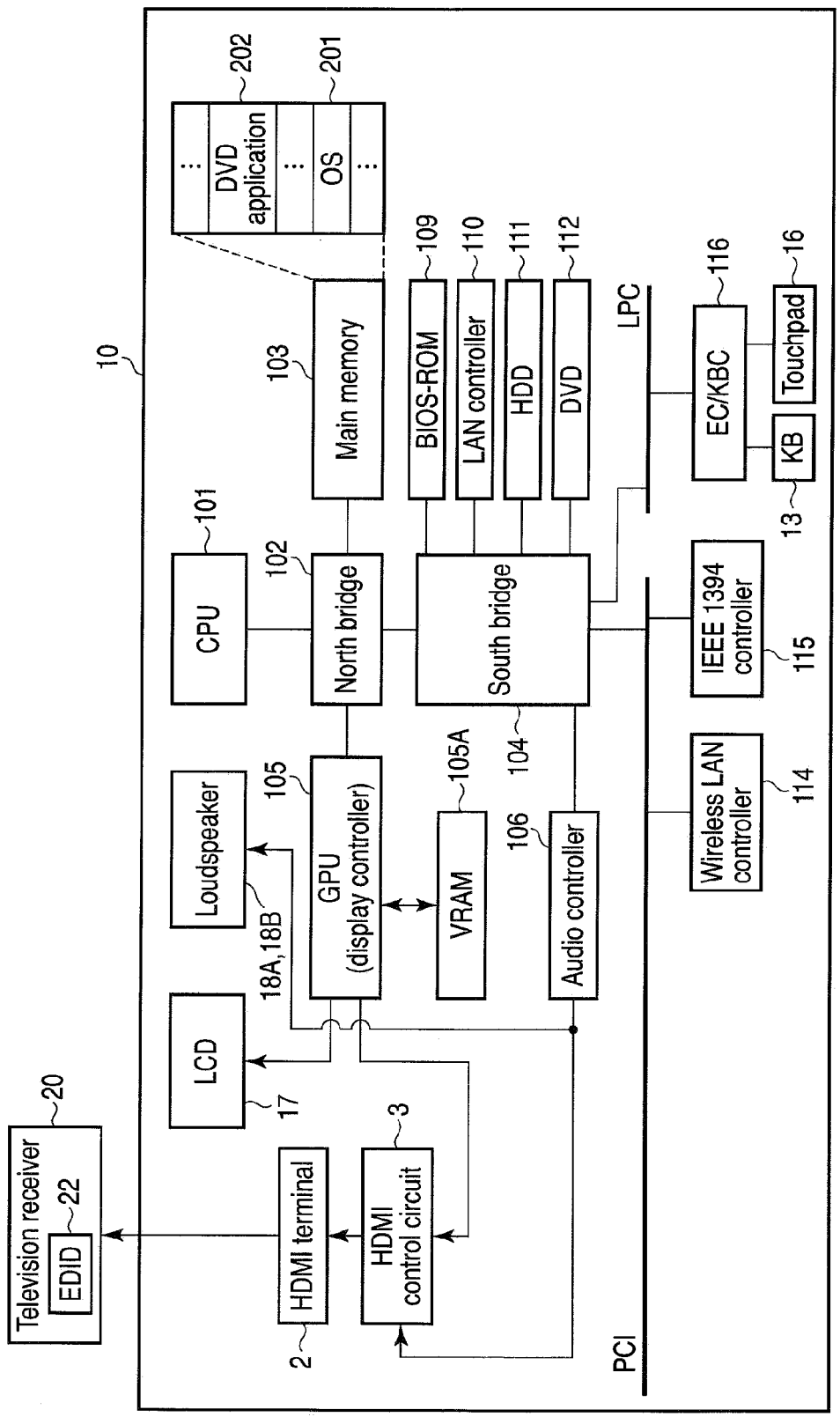
F I G. 2

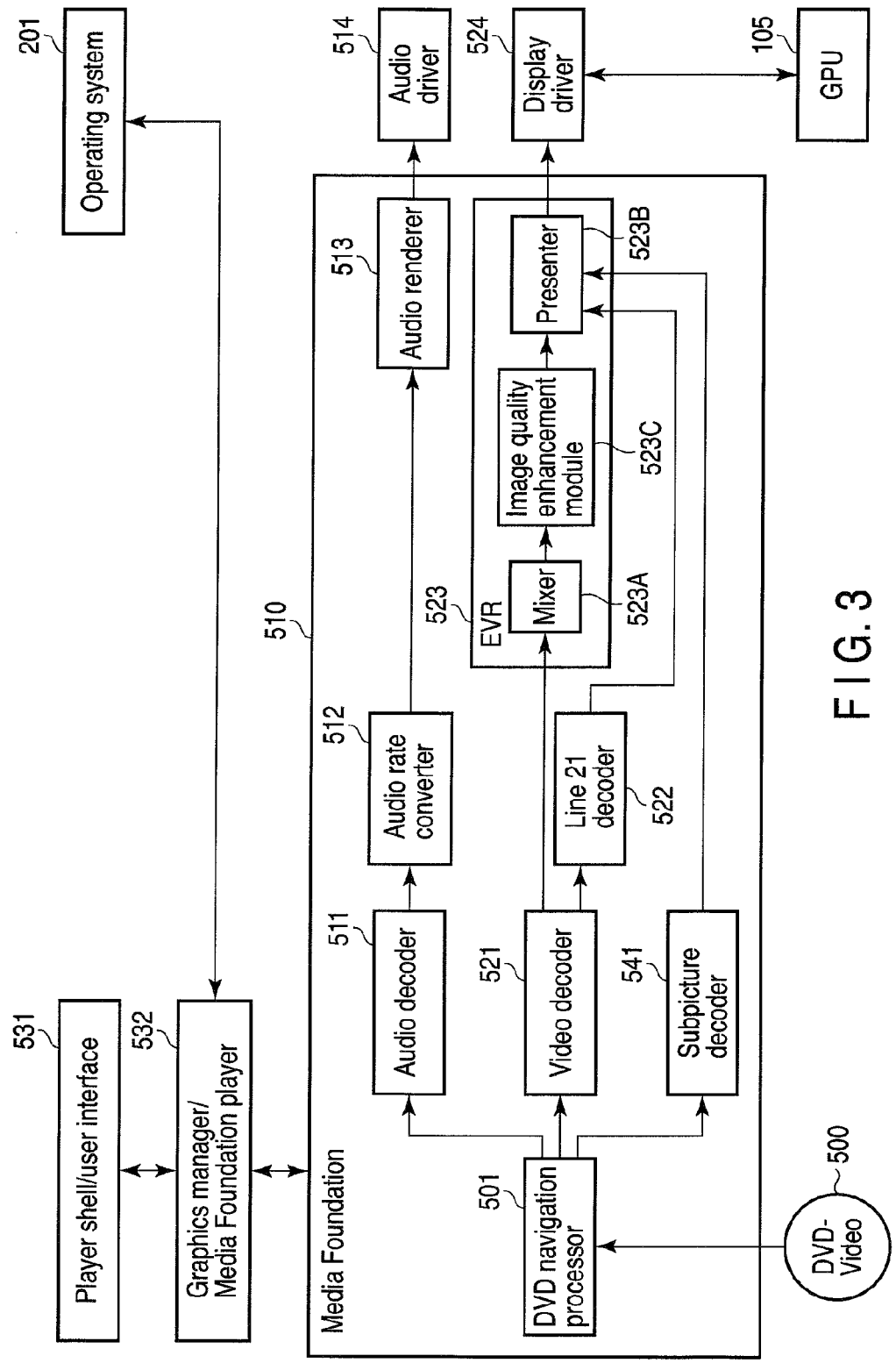
F I G. 3

PLAYBACK APPARATUS AND PLAYBACK METHOD

CROSS-REFERENCE TO RELATED APPLICATIONS

This application is based upon and claims the benefit of priority from Japanese Patent Application No. 2010-113534, filed May 17, 2010; the entire contents of which are incorporated herein by reference.

FIELD

An embodiment described herein relates generally to a playback apparatus and playback method, which execute image quality enhancement processing.

BACKGROUND

An AV application, which is installed in a recent computer and is used to play back a moving image, tends to incorporate image quality enhancement processing, so as to differentiate from applications of other companies.

Currently, image quality enhancement processing is executed based on a single setting irrespective of a monitor used to display a moving image. Currently, a moving image is output to an external display device such as a TV or display in some cases. However, display panels included in computers have various sizes and various numbers of pixels.

When a moving image is displayed on a high-resolution monitor, since it tends to be sharply viewed, it is preferable to soften the image. When a moving image is displayed on a low-resolution monitor, it is preferable to sharpen the image. Therefore, the setting of the image quality enhancement processing is preferably changed depending on the resolutions of display devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing the system arrangement of the playback apparatus and television receiver according to the embodiment.

FIG. 3 is an exemplary block diagram showing the configuration of a DVD application according to the embodiment.

DETAILED DESCRIPTION

Various embodiments will be described hereinafter with reference to the accompanying drawings.

In general, according to one embodiment, a playback apparatus includes a decoder, a resolution receiver, and an image quality enhancer. The decoder configured to decode encoded first moving image data to generate second moving image data. The resolution receiver configured to receive a resolution of a display device on which a video image based on the second moving image data is displayed. The image quality enhancer configured to perform image quality enhancement processing to the second moving image data according to the resolution of the display device.

The arrangement of a playback apparatus according to this embodiment will be described first with reference to FIGS. 1 and 2. The playback apparatus of this embodiment is implemented by, for example, a notebook computer 10.

This notebook computer 10 has a DVD playback function of playing back DVD-Video data stored in a DVD. This DVD playback function is implemented by, for example, a DVD application program, which is installed in advance in the notebook computer 10.

Figure 1:
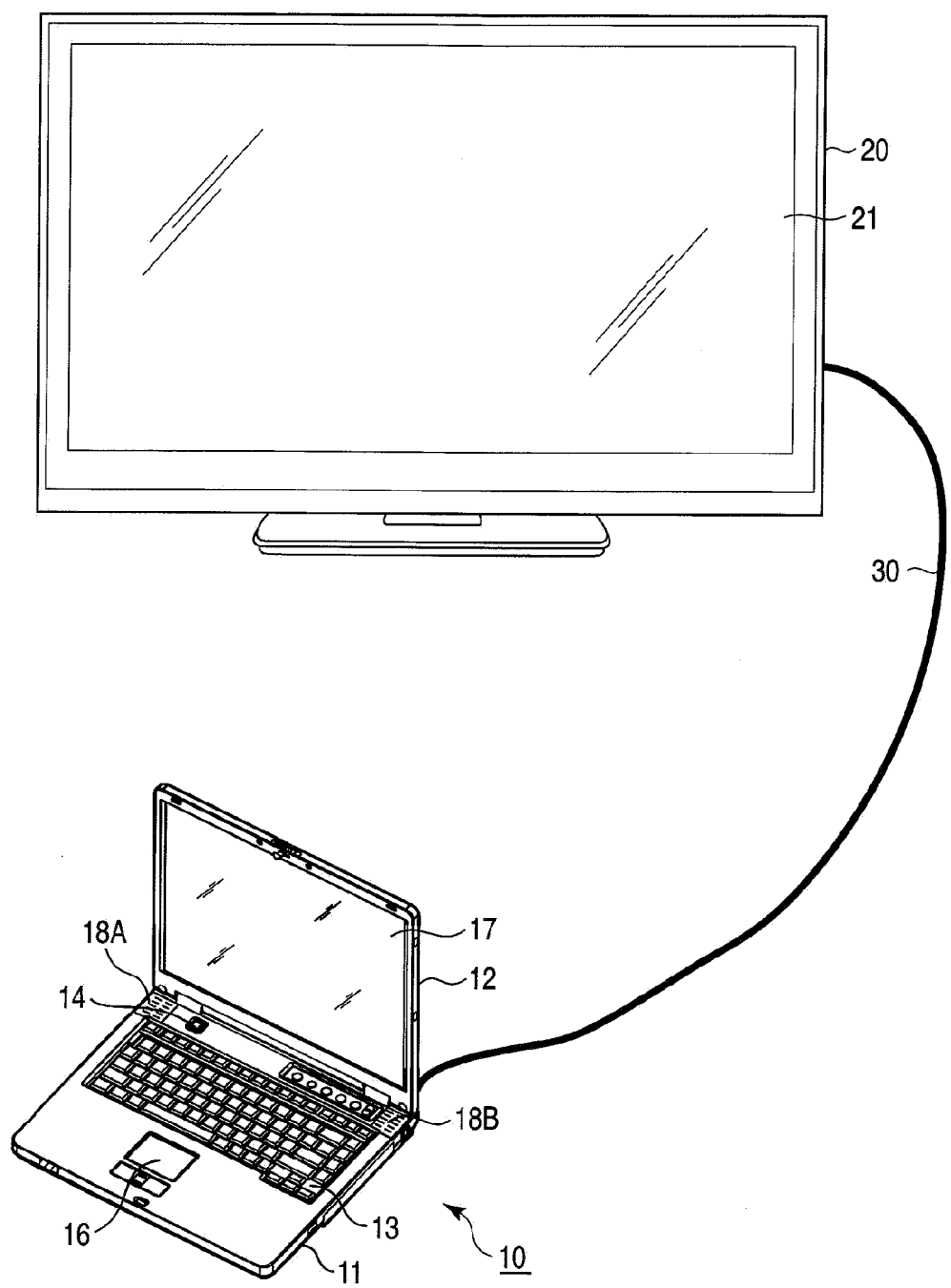
FIG. 1 is an exemplary view showing the outer appearance of a playback apparatus and television according to an embodiment.

FIG. 1 is a perspective view of a state in which a display unit of the computer 10 is open. This computer 10 is configured by a computer main body 11 and display unit 12. In the display unit 12, a display device configured by a thin-film-transistor liquid crystal display (TFT-LCD) 17 is incorporated.

The display unit 12 is attached to the computer main body 11 to be pivotal between an open position where the upper surface of the computer main body 11 is exposed and a closed position where the display unit 12 covers the upper surface of the computer main body 11. The computer main body 11 has a low-profile box-like housing. On the upper surface, a keyboard 13, a power button 14 used to power on/off this computer 10, a touchpad 16, and loudspeakers 18A and 18B are arranged.

On, for example, the back surface of the computer main body 11, an external display connection terminal compliant with, for example, the High-Definition Multimedia Interface (HDMI) standard is provided. This external display connection terminal is used to output video data (moving image data) included in video content data such as broadcast program data to a television 20 via an HDMI cable 30.

In the television 20, a display panel configured by a TFT-LCD 21 is built in.

The system arrangement of the computer 10 and the arrangement of the television 20 will be described below with reference to FIG. 2.

The television 20 has extended display identification data (EDID) 22. The EDID 22 is stored in, for example, a flash memory. The EDID 22 is data required to notify a GPU 105 (described later) of unique information (vendor name, model number, panel size, number of pixels, refresh rate, etc.) of the display. An application which runs inside the computer 10 can acquire the EDID 22 via a driver which controls the GPU 105.

As shown in FIG. 2, this computer 10 includes a CPU 101, north bridge 102, main memory 103, south bridge 104, graphics processing unit (GPU) 105, video memory (VRAM) 105A, audio controller 106, BIOS-ROM 109, LAN controller 110, hard disk drive (HDD) 111, DVD drive 112, wireless LAN controller 114, IEEE 1394 controller 115, and embedded controller/keyboard controller IC (EC/KBC) 116.

The CPU 101 is a processor required to control the operation of this computer 10, and executes an operating system (OS) 201 and various application programs such as a DVD application program 202, which are loaded from the hard disk drive (HDD) 111 onto the main memory 103. The DVD application program 202 is software required to play back a DVD loaded into the DVD drive 112. The CPU 101 also executes a Basic Input/Output System (BIOS) stored in the BIOS-ROM 109. The BIOS is a program for hardware control.

The north bridge 102 is a device bridge which connects a local bus of the CPU 101 and the south bridge 104. The north bridge 102 incorporates a memory controller which controls accesses to the main memory 103. The north bridge 102 also has a function of executing a communication with the GPU 105 via, for example, a PCI EXPRESS serial bus.

The GPU 105 is a display controller, which controls the LCD 17 used as a display monitor of this computer 10. The GPU 105 uses the VRAM 105A as a work memory. A video signal generated by this GPU 105 is sent to the LCD 17. Also, the GPU 105 can output a digital video signal to the LCD 21 in the television 20 via an HDMI control circuit 3 and HDMI terminal 2. The GPU 105 has a plurality of arithmetic processors, and can execute a pixel shader using at least some of the plurality of arithmetic processors simultaneously with generation of a display signal.

When video signals are output to the LCDs 17 and 21, frame rates of video images corresponding to the respective video signals are equal to each other. This frame rate corresponds to a refresh rate of the LCD 17.

The HDMI terminal 2 is the aforementioned external display connection terminal. The HDMI terminal 2 can output a non-compressed digital video signal and digital audio signal to the television 20 such as a television via a single cable. The HDMI control circuit 3 is an interface required to output a digital video signal to the television 20 called an HDMI monitor via the HDMI terminal 2.

The south bridge 104 controls devices on a Low Pin Count (LPC) bus and those on a Peripheral Component Interconnect (PCI) bus. Also, the south bridge 104 incorporates an Integrated Drive Electronics (IDE) controller required to control the hard disk drive (HDD) 111 and DVD drive 112. Furthermore, the south bridge 104 has a function of executing a communication with the audio controller 106.

The audio controller 106 is an audio source device, and outputs audio data to be played back to the loudspeakers 18A and 18B or the HDMI control circuit 3.

The wireless LAN controller 114 is, for example, a wireless communication device which executes wireless communication compliant with, for example, the IEEE 802.11 standard. The IEEE 1394 controller 115 executes communication with an external device via an IEEE 1394 serial bus.

The embedded controller/keyboard controller IC (EC/KBC) 116 is a single-chip microcomputer which integrates an embedded controller required for power management, and a keyboard controller required to control the keyboard (KB) 13 and touchpad 16. This embedded controller/keyboard controller IC (EC/KBC) 116 has a function of powering on/off this computer 10 in response to an operation of the power button 14 by the user.

FIG. 3 shows the configuration of the DVD application program 202 executed by the CPU 101 of this computer so as to perform a playback operation. This player software uses a technology called Media Foundation which is executed under the Microsoft Windows® operating system. Media Foundation, which is a Windows multimedia platform, generates a topology effecting a flow of media data using three pipeline components: Media Source, Transform, and Media Sink. Media Source is a component which mainly handles input data and generates media data; Transform is a component, such as a decoder, which is located at an intermediate position in the media data processing; and Media Sink is a component, such as a renderer, which outputs media data.

DVD-VIDEO data played back by the DVD drive 112 is sent to a navigation processor 501. The DVD-VIDEO data is scrambled by the Content Scramble System (CSS). The navigation processor 501 descrambles the scrambled data, and demultiplexes a video pack (V_PCK), subpicture pack (SP_PCK), and audio pack (A_PCK) from the descrambled data. The navigation processor 501 passes the audio pack (A_PCK) to an audio decoder 511. Also, the navigation processor 501 passes the video pack (V_PCK) and subpicture pack (SP_PCK) to a subpicture decoder 541.

The audio decoder 511 decompresses compression-encoded audio information to convert it into non-compressed audio data, and passes the audio data to an audio rate converter 512. The audio rate converter 512 converts the audio data to have an appropriate sampling rate, and passes the converted audio data to an audio renderer 513. The audio renderer 513 synthesizes the passed audio data and audio data which is generated by another software that runs on the computer, and passes the synthesized data to an audio driver 514. The audio driver 514 controls the audio controller 106 to output an audio from the loudspeakers 18A and 18B.

In a video decoder 521, if line 21 data is included, the line 21 data is passed to a line 21 decoder 522. The video decoder 521 decodes the video pack (V_PCK) to generate a video field. The subpicture decoder 541 decodes the subpicture pack (SP_PCK). The decoded data are sent to an extended video renderer 523.

A mixer 523A in the extended video renderer 523 executes interlaced/progressive (I/P) conversion for a plurality of fields passed from the video decoder 521, and generates video frames from the fields. The generated frames are passed to a presenter 523B.

An image quality enhancement module 523C applies image quality enhancement processing to data output from the mixer 523A based on setting values set by a graphics manager/Media Foundation player 532. The graphics manager/Media Foundation player 532 sets setting values according to a display device on which a moving image is displayed in the image quality enhancement module. The graphics manager/Media Foundation player 532 sets, in the image quality enhancement module, setting values according to a size of a window in which the moving image is displayed.

The presenter 523B executes processing for compositing a subpicture (decompressed subpicture pack) and closed caption on each frame whose image quality is enhanced, and processing for rendering frames.

Moving image data output from the presenter 523B is passed to a display driver 524. The display driver 524 controls the GPU 105 to display a moving image on the LCD 17 or TFT-LCD 21.

A player shell/user interface 531 executes processing associated with display of a playback control panel. The player shell/user interface 531 notifies Media Foundation 510 via the graphics manager/Media Foundation player 532 of a command according to a button operated by the user. Media Foundation 510 controls a topology configured by the navigation processor 501, audio decoder 511, and video decoder 521 in accordance with the notified command.

Figure 4:
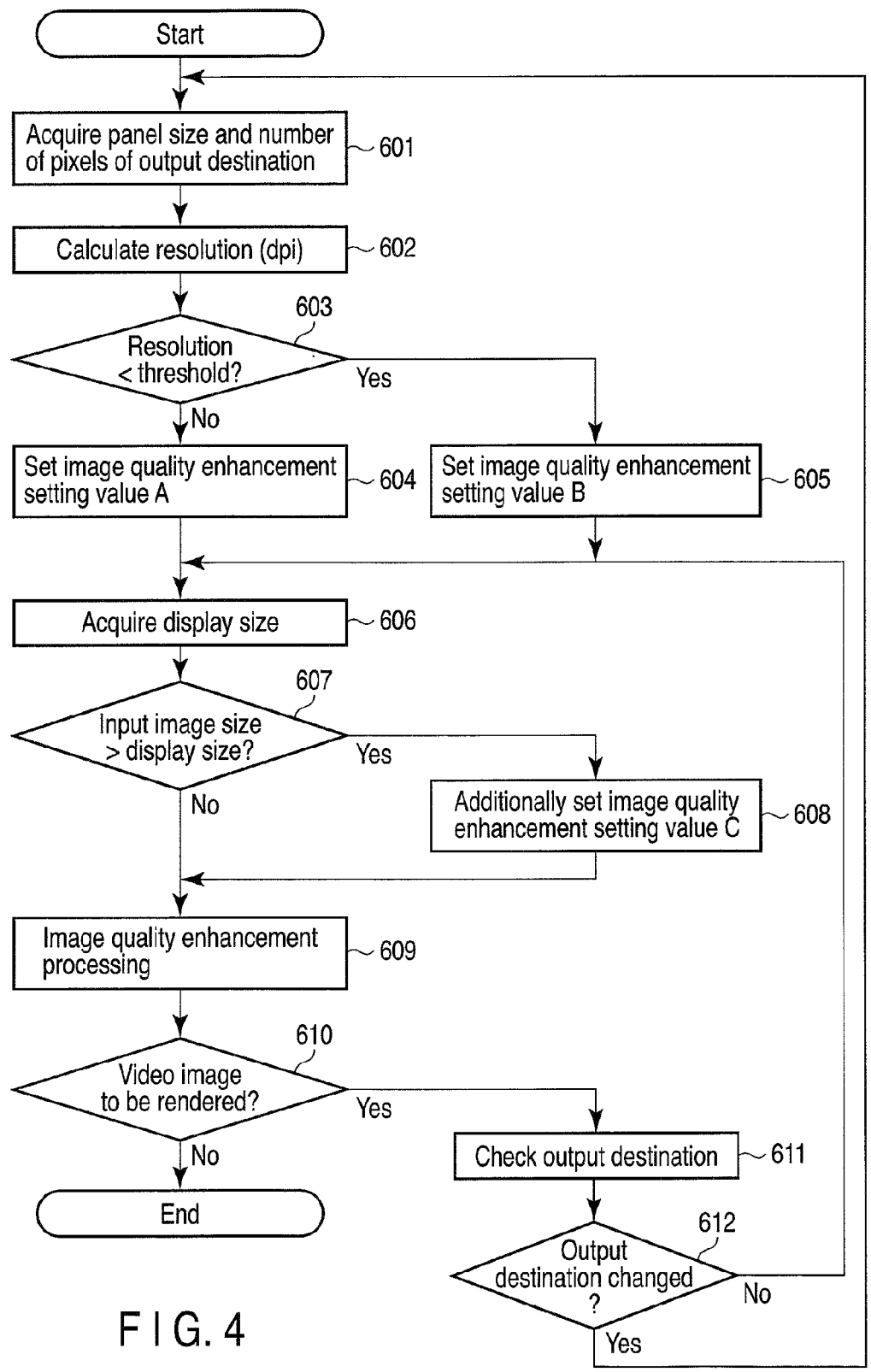
FIG. 4 is an exemplary flowchart showing the sequence for setting image enhancement setting values according to the embodiment.

The sequence for changing settings of the image quality enhancement processing will be described below with reference to FIG. 4.

The graphics manager/Media Foundation player 532 acquires the panel size and the number of pixels (for example, 1920×1080) of a display device (television 20 or LCD 17) as an output destination of a window in which a moving image is displayed from the operating system 201 (block 601). The graphics manager/Media Foundation player 532 calculates a resolution (in dots per inch [dpi]) from the acquired panel size and number of pixels (block 602). For example, a resolution R is calculated by:

$$R=\{(P_x^2+P_y^2)^{1/2}\}/S$$

where $P_x$ is the number of pixels of the panel in the horizontal direction, $P_y$ is the number of pixels of the panel in the vertical direction, and S is the panel size.

The graphics manager/Media Foundation player 532 determines if the calculated resolution is smaller than a threshold (block 603). If the resolution is smaller than the threshold (Yes in block 603), the graphics manager/Media Foundation player 532 sets an image quality enhancement setting value B in the image quality enhancement module 523C (block 605). If the resolution is not smaller than the threshold (No in block 603), the graphics manager/Media Foundation player 532 sets an image quality enhancement setting value A in the image quality enhancement module 523C (block 604). Image quality enhancement setting values A and B include, for example, sharpness setting values for edge emphasis. The sharpness setting value included in image quality enhancement setting value A is higher than that included in image quality enhancement setting value B. When the resolution is low, since details are hard to see, a high degree sharpness is set to allow details to be seen. When the resolution is high, since eye strain is produced if edges are emphasized, a low degree of sharpness is set to soften the image.

Next, the graphics manager/Media Foundation player 532 acquires the size of a window in which a moving image is displayed from the operating system (block 606).

The graphics manager/Media Foundation player 532 determines if the number of pixels of a source video image is greater than the window size (block 607). If it is determined that the number of pixels of the source video image is greater than the window size (Yes in block 607), the graphics manager/Media Foundation player 532 sets an image quality enhancement setting value C in the image quality enhancement module 523C (block 608). Image quality enhancement setting value C is a setting value to increase the sharpness set in block 604 or 605.

If it is determined that the number of pixels of the source video image is not greater than the window size (No in block 607), or after block 608, the image quality enhancement module 523C executes the image quality enhancement processing according to the setting value (block 609). The graphics manager/Media Foundation player 532 determines if data is supplied from the video decoder 521 is supplied to the extended video renderer 523 (block 610).

If it is determined that moving image data is supplied (Yes in block 610), the graphics manager/Media Foundation player 532 acquires the output destination of the window from the operating system 201 (block 611). The graphics manager/Media Foundation player 532 determines if the output destination is different from the display whose panel size and the number of pixels are acquired in block 601 (block 612). If it is determined that the output designation is different (Yes in block 612), the graphics manager/Media Foundation player 532 executes the processes from block 601 in turn. If it is determined that the output destination is not different (No in block 612), the graphics manager/Media Foundation player 532 executes the processes from block 606 in turn.

With the aforementioned processing, the optimal image quality enhancement processing can be executed according to the resolution of a display device. Also, the optimal image quality enhancement processing can be executed according to the window size in which a moving image is displayed.

Figure 5:
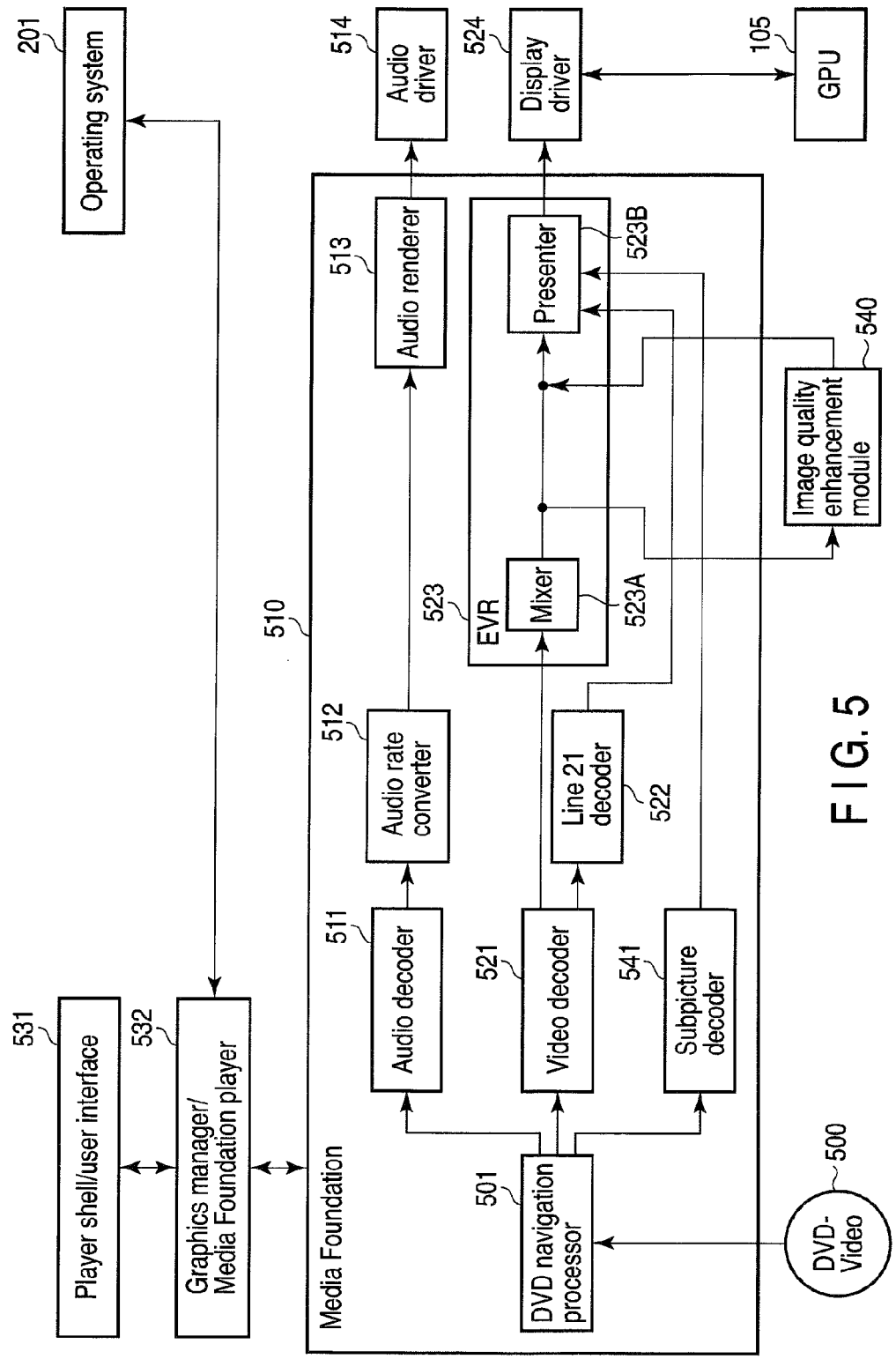
FIG. 5 is an exemplary block diagram showing another configuration of the DVD application according to the embodiment.

In the above embodiment, the image quality enhancement module 523C is arranged in the extended video renderer 523. In this case, the extended video renderer 523 is required to be separately prepared. However, as shown in a configuration shown in FIG. 5, when an image quality enhancement module 540 is incorporated between the mixer 523A and presenter 523B as a plug-in, the aforementioned function can be implemented without altering the existing application.

Note that this embodiment has mainly explained the sharpness as the image quality enhancement processing. However, the e is not limited to this. For example, this embodiment is also applicable to resolution enhancement processing and contrast correction, and crosstalk cancellation processing in a three-dimensional player.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A playback apparatus comprising:
 a resolution receiver configured to determine a resolution of a display device; and
 an image quality enhancer configured to perform image quality enhancement processing upon a moving image data based on the resolution, wherein the image quality enhancer is configured to adjust sharpness of the moving image data based on the resolution, wherein the image quality enhancer is configured to adjust a setting value of the sharpness to a first value when the resolution is greater than threshold, and to adjust the setting value to a second value when the resolution is not greater than the threshold.

2. The apparatus of claim 1, wherein the resolution receiver is configured to receive a panel size and a number of pixels associated with the display device, the resolution receiver further configured to calculate the resolution based on the received panel size and the received number of pixels.

3. The apparatus of claim 1, further comprising a size receiver, the size receiver configured to receive a size of a window, and
 wherein the image quality enhancer is configured to set a setting value of the image quality enhancement processing based on the size received by the size receiver.

4. The apparatus of claim 3, wherein the image quality enhancer is configured:
 to adjust a setting value of the sharpness to a first value when the number of pixels of the moving image data is greater than the size of the window, and to adjust the setting value to a second value when the number of pixels of the moving image data is not greater than the size of the window.

5. The apparatus of claim 1, wherein the second setting value is higher than the first setting value.

6. The apparatus of claim 1, wherein the moving image data comprises first image data by decoding encoded second moving image data.

7. The apparatus of claim 1, wherein the display device comprises an external display device.

8. A playback method comprising: determining a resolution of a display device; and adjusting sharpness of moving image data by an image quality enhancer based on the resolution, wherein the adjusting comprises adjusting a setting value of the sharpness to a first value when the resolution is greater than threshold, and adjusting the setting value to a second value when the resolution is not greater than the threshold.

9. The method of claim 8, wherein determining the resolution comprises:
receiving a panel size and a number of pixels from the display device; and
calculating the resolution based on the received panel size and the received number of pixels.

10. The method of claim 8, wherein the image quality enhancement processing comprises:
adjusting a setting value of the sharpness to a first value when the number of pixels of the moving image data is greater than the size of the window, and adjusting the setting value to a second value when the number of pixels of the moving image data is not greater than the size of the window.

11. The method of claim 8, further comprising:
determining a size of a window in which a video image based on the moving image data is displayed, and
setting a setting value of the image quality enhancement processing based on the received size.

12. The method of claim 11, wherein the image quality enhancement processing comprises:
adjusting a sharpness of the moving image data, and
adjusting a setting value of the sharpness to a first value when the number of pixels of the moving image data is greater than the size of the window, and adjusting the setting value to a value when the number of pixels of the moving image data is not greater than the size of the window.

* * * * *